Feb. 23, 1932. L. C. KUEHNER 1,846,208
SIGNAL LAMP
Filed July 13, 1929 2 Sheets-Sheet 2

Patented Feb. 23, 1932

1,846,208

UNITED STATES PATENT OFFICE

LOUIS C. KUEHNER, OF ST. LOUIS, MISSOURI, ASSIGNOR TO HANDLAN-BUCK MANUFACTURING COMPANY, OF ST. LOUIS, MISSOURI, A CORPORATION OF MISSOURI

SIGNAL LAMP

Application filed July 13, 1929. Serial No. 377,951.

This invention relates generally to signal lamps and more specifically to signal lamps of the type adapted for association with switch stands arranged along railroad tracks, the predominant object of the invention being to produce an improved signal lamp of this type, which includes a stationary lamp housing within which a rotatable element is arranged, said rotatable element being movable on operation of the associated switch stand to change the color of the signal given by the signal lamp.

Prior to this invention signal lamps associated with switch stands included a lamp housing having four lenses, said lamp housing having a pair of oppositely disposed lenses of one color, green, for instance, and a pair of oppositely disposed lenses of another color, red, for instance, and the lamp housing was mounted on the lamp standard of a switch stand so that when the switch was in one position the lenses of one color were alined with the railroad track and when the position of the switch was changed by operation of the switch stand the lamp housing was rotated to cause the lenses of the other color to be alined with the railroad track.

Signal lamps of the type referred to have a number of disadvantages which are overcome by the improved signal lamp disclosed herein, among which is the reduction of the number of lenses employed from four as heretofore to two. Another advantage of my improved lamp structure over the signal lamps formerly employed resides in the provision in the improved structure of a conduit for the electrical conductors which lead to the light source of the signal lamps. Heretofore, these electrical conductors were loose and because the lamp housing was being continually rotated the electrical conductors were flexed and twisted to such an extent that injury was frequently done to same. In the improved signal lamp structure disclosed herein, the electrical conductors referred to, (with the exception of short sections thereof within the lamp housing) are not affected by rotation of the movable signal changing means, hence, there is no likelihood that said conductors will be injured by continual flexing and twisting thereof.

Other advantages of my improved structure over the structures of the signal lamps of the prior art will be apparent upon examination of the present application and the drawings forming a part thereof in which.

Figure 1:
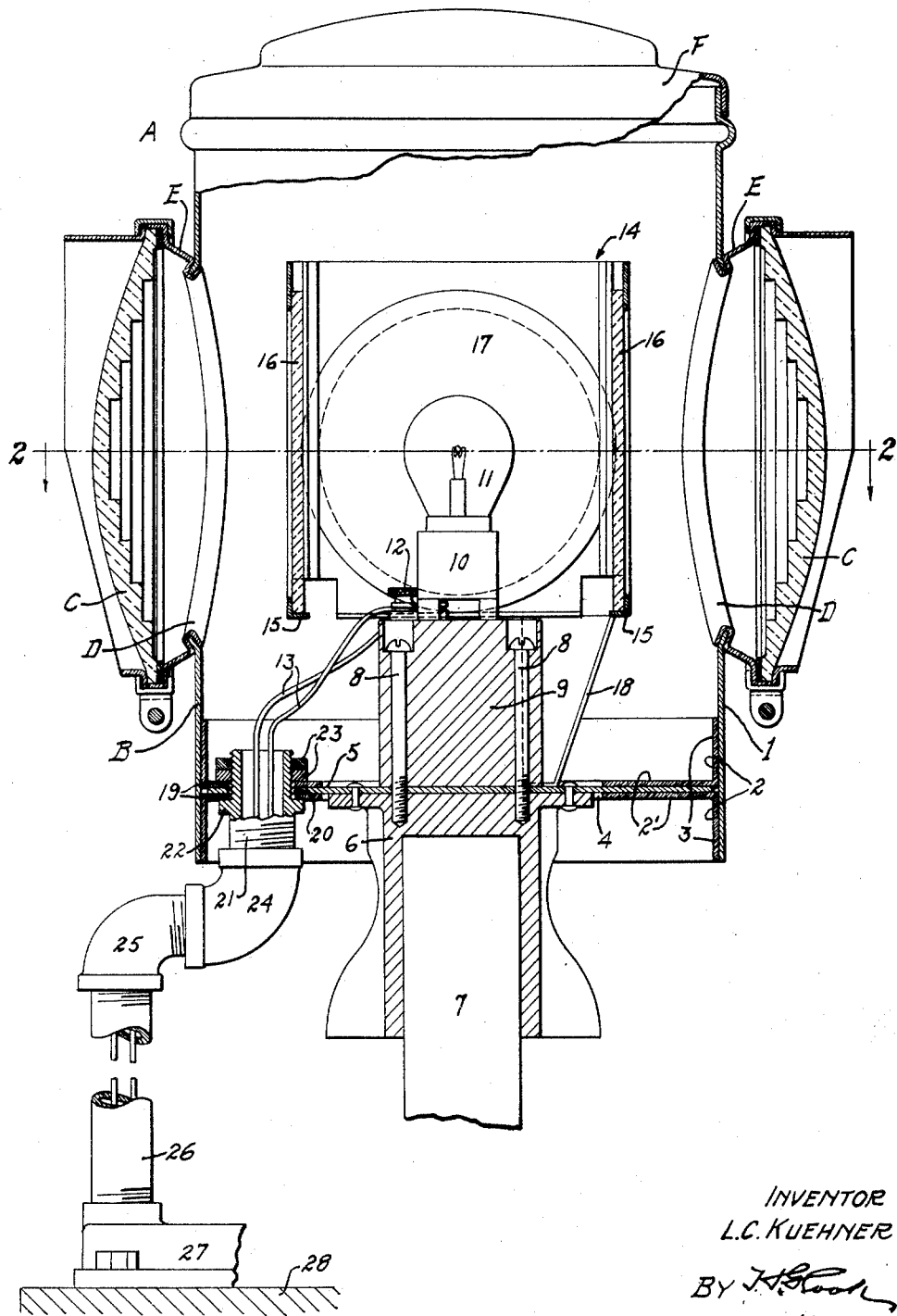
Figure 1 is a vertical section of my improved signal lamp, a portion of the lamp standard of a switch stand and a portion of the combined connector and conduit for the electrical conductors leading to the light source of the lamp, being broken away to conserve space.
Figure 2:
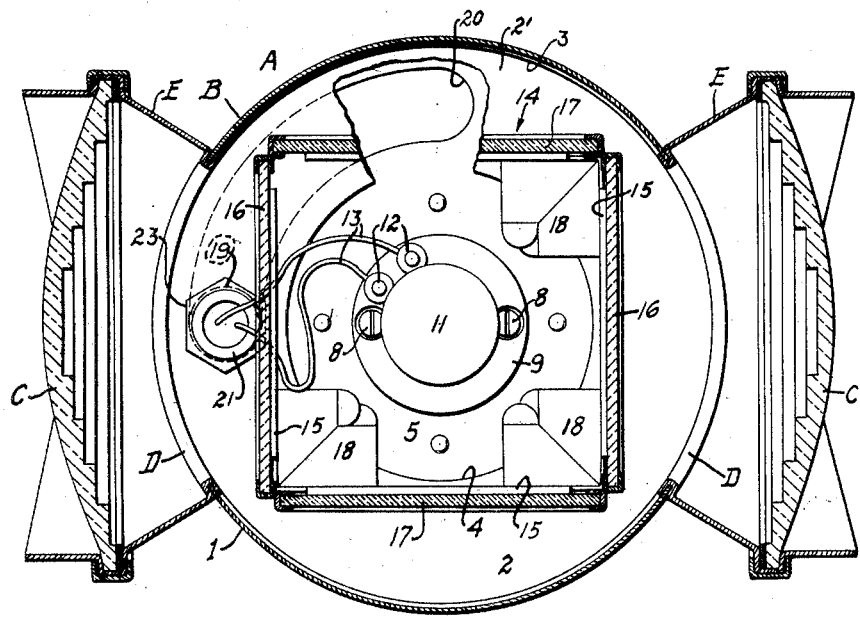
Figure 2 is a cross section on line 2—2 of Figure 1.

In the drawings wherein is shown for the purpose of illustration, merely, one embodiment of the invention A designates my improved signal lamp which includes a lamp housing B provided with a pair of oppositely disposed colorless lenses C which are arranged at openings D formed in the wall of the lamp housing. The lamp housing B includes the usual lens receiving portions E, and said lamp housing is provided with a suitable cover F which permits access to the interior of the lamp housing.

The side wall 1 of the lamp housing B is preferably (though not necessarily) cylindrical in shape and located within the cylindrical side wall at the bottom thereof is a pair of annular bottom wall members 2 which are fixed to the cylindrical side wall. The annular bottom wall members 2 include horizontal portions 2' which are spaced apart from each other in a vertical direction as shown in Figure 1, and said bottom wall members are provided with vertically disposed flange portions 3 which are arranged in contact with the inner face of the side wall 1. The bottom wall members 2 are secured rigidly to the side wall by having the vertical flange portions 3 thereof welded or otherwise secured to said side wall. The annular horizontal portions of the bottom wall portions 2' are of such width, measured from the inner face of the side wall 1, that a substantial opening 4 is provided through the bottom wall provided by the members 2 at the approximate center of the lamp housing.

5 designates a rotatable bottom wall portion of the lamp housing B which comprises a plate the outer edge portion of which is interposed between the horizontally disposed portions 2' of the bottom wall members 2. The rotatable plate referred to is only loosely confined between the horizontal portions 2' and hence said plate may rotate with respect to said horizontal portions. Secured in any suitable manner to the rotatable plate 5 at the lower face thereof is a socket member 6, said socket member being extended downwardly from said plate 5 and being arranged to receive the upper end of a lamp standard 7 comprising a part of a switch stand (not shown).

Secured by means of fastening devices 8 to the rotatable plate 5 and disposed thereabove is a block 9 on which is rigidly mounted a socket 10 adapted to receive an electric bulb 11. The socket 10 is of ordinary construction and is provided with terminals 12 to which electric conductors 13 are attached, said conductors serving to conduct electrical energy to the electric bulb. Arranged within the lamp housing B is a rotatable element 14 by means of which signals of different colors are flashed by the signal lamp. The element 14 comprises a rectangular frame 15 which supports a plurality of sections of colored glass or other suitable material, there being a pair of sections of glass 16 disposed opposite with respect to each other which are of one color, green, for instance, and a pair of sections of glass 17 disposed opposite with respect to each other which are of a different color, red, for instance.

Extended downwardly from the bottom edge of the rectangular frame 15 is a plurality of legs 18, said legs being formed integral with or connected to the rectangular frame at their upper ends and being secured to the rotatable plate 5 at their lower ends. Due to the fact that the rectangular frame 15 is fixed to the rotatable plate 5 through the instrumentality of the legs 18 it is plain that said rectangular frame together with the associated sections of glass will move with the plate 5 when same is subjected to rotary movement.

Formed through the horizontal portions 2' of the bottom wall members 2 are registering circular apertures 19, and formed through the rotatable plate 5 is an arcuate slot 20. 21 designates a short tubular member which is extended through the apertures 19 and the arcuate slot 20, said tubular member being provided with a flange 22 providing a shoulder which contacts with the bottom face of the lowermost horizontal portion 2' of the bottom wall members 2, and having screwthreads formed on the portion thereof extended above said shoulder. Nuts 23 are screwed on the screwthreaded portion of the tubular member 21 and serve with the flange 22 to securely fasten the tubular member 21 to the bottom wall of the lamp housing, portions of the bottom wall members 2 being confined between said flange 22 and said nuts 23. 24 and 25 designate elbows which are screwed to the tubular member 21 and screwed together as shown in Figure 1 and 26 designates a section of pipe which screws into the elbow 25 at its upper end and at its lower end is screwed into a tapped opening formed in a base member 27 which is secured to a railroad tie or other stationary element 28. The electric conductors 13 are extended through the conduit provided by the tubular member 21, elbows 24 and 25, pipe 26, and base member 27 and, therefore, said conductors are protected from injury.

In the use of the signal lamp disclosed herein rays of light cast by the electric bulb 11 passes through the colored sections of glass which are alined with the lenses C of the lamp housing and cause a signal of the color of the sections of glass so alined with the lenses C to be given by the lamp. When the switch stand of which the lamp standard 7 forms a part is operated, said lamp standard is rotated axially and because said lamp standard is connected to the rotatable plate 5 of the bottom wall of the signal lamp, said plate 5 will likewise be rotated. The rectangular frame 14 which supports the sections of colored glass is fixed to the rotatable plate 5 by the legs 18, hence, said rectangular frame will rotate with the plate 5 with the result that the sections of colored glass alined with the lenses C of the lamp housing will be moved out of alinement with said lenses and the pair of sections of colored glass of a different color will be moved into alinement with the lenses to change the color of the signal given by the signal lamp.

It is obvious, therefore, that the colors of the signals given by the signal lamp are changed without rotation of the lamp housing, said lamp housing being prevented from rotating by the connection provided by the tubular member 21, elbows 24 and 25, pipe 26, and base member 27, which rigidly connects said lamp housing to the railroad tie or other stationary support 28. Also it is plain that as only very short sections of the electric conductors within the lamp housing are flexed when the rotatable element 14 is rotated there is very little likelihood that said conductors will be injured by such flexing thereof.

I claim:

1. In combination with a stationary support, a signal lamp comprising a lamp housing provided with a lens, means connecting said lamp housing to said support to prevent rotation of said lamp housing, a rotatable element disposed within said lamp housing, a plurality of transparent members of different colors supported by said rotatable element and movable therewith into and out of alinement with said lens, a light source fixed to and movable with said rotatable element, said light source being arranged within said lamp housing and adapted to project light rays through said transparent members and through said lens, and conductors for electrical energy leading to said light source which extend through the bottom wall of said lamp housing, said connecting means serving as a conduit for said conductors.

2. In combination with a stationary support, a signal lamp comprising a lamp housing having a bottom wall and provided with a lens, means connecting said lamp housing to said support to prevent rotation of said lamp housing, a rotatable element disposed within said lamp housing, a plurality of transparent members of different colors supported by said rotatable element and movable therewith into and out of alinement with said lens, a light source fixed to and movable with said rotatable element, said light source being arranged within said lamp housing and adapted to project light rays through said transparent members and through said lens, conductors for electrical energy leading to said light source which extend through the bottom wall of said lamp housing, and said connecting means serving as a conduit for said conductors, and means for imparting rotary movement to said rotatable element.

3. In combination with a stationary support, a signal lamp comprising a lamp housing having a bottom wall and provided with a lens, means connecting said lamp housing to said support to prevent rotation of said lamp housing, a rotatable element disposed within said lamp housing, a plurality of transparent members of different colors supported by said rotatable element and movable therewith into and out of alinement with said lens, a light source fixed to and movable with said rotatable element, said light source being arranged within said lamp housing and adapted to project light rays through said transparent members and through said lens, conductors for electrical energy leading to said light source which extend through the bottom wall of said lamp housing, said connecting means serving as a conduit for said conductors, and a rotatable lamp stand for imparting rotary movement to said rotatable element.

4. In combination with a stationary support, a signal lamp comprising a lamp housing provided with a lens, said lamp housing having a rotatable bottom wall portion and a stationary bottom wall portion, means connecting said lamp housing to said stationary support, said means including a portion extended through an opening formed in said rotatable bottom wall portion, a rotatable member disposed within said lamp housing and fixed to said rotatable bottom wall portion, a plurality of transparent members of different colors supported by said rotatable member and movable therewith into and out of alinement with said lens, a light source fixed to and movable with said rotatable bottom wall portion, said light source being arranged within said lamp housing and adapted to project rays of light through said transparent members and through said lens, and means connected to said rotatable bottom wall portion of said lamp housing for imparting rotary movement thereto, said light source having conductors for electrical eneregy leading thereto, and said means for connecting said lamp housing to said stationary support providing a conduit for said conductors.

In testimony that I claim the foregoing I hereunto affix my signature.

LOUIS C. KUEHNER.